United States Patent
De Lega et al.

(10) Patent No.: US 6,195,168 B1
(45) Date of Patent: Feb. 27, 2001

(54) INFRARED SCANNING INTERFEROMETRY APPARATUS AND METHOD

(75) Inventors: Xavier Colonna De Lega; Peter De Groot; Leslie L. Deck, all of Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 09/514,215

(22) Filed: Feb. 25, 2000

Related U.S. Application Data

(60) Provisional application No. 60/145,180, filed on Jul. 22, 1999.

(51) Int. Cl.[7] .................................................. G01B 09/02

(52) U.S. Cl. ............................ 356/497; 356/511; 356/513

(58) Field of Search .................................. 356/452, 479, 356/497, 511, 513, 514

(56) References Cited

U.S. PATENT DOCUMENTS

| | | | |
|---|---|---|---|
| 4,340,306 | 7/1982 | Balasubramanian | 356/360 |
| 5,166,749 | * 11/1992 | Curbelo et al. . | |
| 5,398,113 | 3/1995 | de Groot | 356/360 |
| 5,402,234 | 3/1995 | Deck | 356/357 |
| 5,471,303 | 11/1995 | Ai et al. | 356/357 |
| 5,598,265 | 1/1997 | de Groot | 356/360 |
| 5,841,546 | * 11/1998 | Carangelo et al. . | |

FOREIGN PATENT DOCUMENTS 04108 944 C2   1/1993   (DE) .

OTHER PUBLICATIONS

Wyant, "How to extend interferometry for rough–surface tests" *Laser Focus World*, pp. 131–135, Sep. 1993.

de Groot et al., "Surface profiling by analysis of white–light interferograms in the spatial frequency domain" *Journal of Modern Optics*, 42:2 389–401, 1995.

Ai, "IR Interferometers Using Modern Cameras" *SPIE*, 3134:461–464, 1997.

Dresel et al., "Three–dimensional sensing of rough surfaces by coherence radar" *Applied Optics*, 31:7 919–925, Mar. 1, 1992.

* cited by examiner

*Primary Examiner*—Robert Kim
(74) *Attorney, Agent, or Firm*—Fish & Richardson P.C.

(57) ABSTRACT

The invention features an interferometry system for a measuring a surface profile or thickness of a measurement object. In one aspect, the interferometry system includes: a broadband infrared source which during operation generates broadband infrared radiation including central wavelengths greater than about 1 micron; a scanning interferometer which during operation directs a first infrared wavefront along a reference path and a second infrared wavefront along a measurement path contacting the measurement object, and, after the second wavefront contacts the measurement object, combines the wavefronts to produce an optical interference pattern, the first and second infrared wavefronts being derived from the broadband infrared radiation; a detector producing data in response to the optical interference pattern; and a controller which during operation causes the scanning interferometer to vary the optical path difference between the reference and measurement paths over a range larger than the coherence length of the broadband source and analyzes the data as a function of the varying optical path difference to determine the surface profile.

51 Claims, 8 Drawing Sheets

INFRARED SCANNING INTERFEROMETRY APPARATUS AND METHOD

CROSS-REFERENCE TO RELATED APPLICATIONS

This application claims priority from provisional application 60/145,180, filed Jul. 22, 1999, the contents of which are incorporated herein by reference.

BACKGROUND OF INVENTION

The invention relates interferometry apparatus and methods, more particularly, to interferometry apparatus and methods for measuring the profile of a surface on an industrial part.

Interferometric techniques are commonly used to measure the profile of a surface of an object. To do so, an interferometer combines a measurement wavefront reflected from the surface of interest with a reference wavefront reflected from a reference surface to produce an interferogram. Fringes in the interferogram indicate spatial variations between the surface of interest and the reference surface. For example, a single-wavelength visible interferometer using phase-shifting techniques can measure surface variations on the order of Angstroms. Such accuracy is important in applications such as characterizing of glass substrates used in lithographic photomasks.

Another type of interferometer is a white-light scanning interferometer, which uses a white-light source and scans the relative path length of the reference and measurement legs of the interferometer. Because the white-light source has a limited coherence length, interference fringes in the interferogram are only present where the optical path difference (OPD) between the measurement and reference paths for corresponding points on the surface of interest and the reference flat is less than the coherence length. Thus, the scanning interferometer can resolve a step, or an otherwise large and/or discontinuous, variation in the surface of interest by scanning the relative path length of the reference and measurement legs, recording multiple interferograms, and determining where in each interferogram interference fringes are present. See, e.g., N. Balasubramanian in U.S. Pat. No. 4,340,306 for additional information regarding scanning interferometers. Furthermore, phase-shifting techniques can be combined with scanning interferometry to interpolate the phase of individual fringes and thereby more accurately determine surface variations.

Complications with interferometric techniques arise, however, when the surface of interest is rough on the scale of the illumination wavelength. The rough surface can scatter the measurement wavefront and corrupt the phase of whatever interference fringes are present in the interferogram. Nonetheless, recent studies have shown that white-light scanning interferometry can be used to measure the profile of a rough surface. In particular, when the surface of interest is sufficiently rough relative to the illumination wavelength, the interferogram includes speckle. Although the speckle corrupts the phase of any interference fringes, they nonetheless exhibit intensity oscillations as a function of OPD when the OPD is within the coherence length of the white-light source. Thus, white-light scanning interferometry can determine the surface profile of a rough surface to within about the coherence length. See, e.g., T. Dresel, G. H äusler, and H. Venzke, in *Applied Optics* 31:919–925 (1992).

SUMMARY OF THE INVENTION

The invention features a scanning interferometer employing a broadband infrared source. The broadband infrared source provides the advantages of scanning interferometry and also provides additional advantages relative to interferometers that operate at smaller, visible wavelengths. Notably, there can be less scattering at infrared wavelengths from surfaces that appear rough at visible wavelengths than there would be for visible wavelengths. Therefore, the scanning interferometer can produce broadband interferograms having interference fringes free of speckle. Furthermore, as explained in greater detail below, the larger wavelengths provide a larger field of view (FOV) and lessen the constraints of finite camera pixel size on measuring complex surface profiles. Thus, the scanning interferometer is especially suitable for the measurement of surfaces of precision-engineered components used in industrial manufacturing, such as fuel system components, bearings, brake components, seals, rotors, pumps, turbine blades and disk, etc..

The scanning interferometer can also be used to profile objects that may be substantially opaque at visible wavelengths, but are more transparent in the infrared. For example, the scanning interferometer can be used to measure the profiles of the front and back surfaces of a silicon wafer, as well as its thickness.

In general, in one aspect, the invention features an interferometry system for a measuring a surface profile of a measurement object. The interferometry system includes: a broadband infrared source which during operation generates broadband infrared radiation including central wavelengths greater than about 1 micron; a scanning interferometer which during operation directs a first infrared wavefront along a reference path and a second infrared wavefront along a measurement path contacting the measurement object, and, after the second wavefront contacts the measurement object, combines the wavefronts to produce an optical interference pattern, the first and second infrared wavefronts being derived from the broadband infrared radiation; a detector producing data in response to the optical interference pattern; and a controller which during operation causes the scanning interferometer to vary the optical path difference between the reference and measurement paths over a range larger than the coherence length of the broadband source and analyzes the data as a function of the varying optical path difference to determine the surface profile.

Embodiments of the interferometry system can include any of the following features. The broadband infrared radiation can include central wavelengths within the range of about 3 micron to 11 microns. The coherence length of the broadband infrared radiation can be in the range of about 10 to 100 microns. The system can further include a mount configured to support the measurement object at substantially normal incidence to the measurement path. The scanning interferometer can be of a type that can produce a zero optical path difference between the measurement and reference paths. The interferometer can include at least one imaging optic, which during operation directs the combined wavefronts onto the detector to form the optical interference pattern. The imaging optics can be configured to demagnify the surface of the measurement object with respect to the optical interference pattern formed on the detector. For example, the demagnification can be in the range of about 1× to about 0.1×. The interferometer can produce a field of view on the detector greater than about 5 mm, e.g., in the range of about 10 mm to 100 mm. The interferometer can include a reference mirror positioned along the reference path and a translation stage supporting the reference mirror, the translation stage being connected to the controller for varying the optical path difference between the reference and measurement paths. The interferometer can include a reference mount configured to support a reference object having a surface contacted by the reference path. The interferometer can further include the reference object, which can have flat or shaped reflective surface. The interferometer can include a beam splitter positioned to separate the broadband infrared radiation into the first and second infrared wavefronts and at least one compensating optic positioned along the measurement path to cause curvature in the second infrared wavefront. During operation, the controller can determine the thickness profile of the measurement object based on optical interference pattern data corresponding to reflections of the second infrared wavefront from front and back surfaces of the measurement object.

In general, in another aspect, the invention features an interferometry system for a measuring a surface profile of a measurement object. The interferometry system includes: a broadband infrared source which during operation generates broadband infrared radiation including central wavelengths greater than about 1 micron, the broadband infrared radiation having a coherence length of less than 100 microns; a scanning interferometer which during operation directs a first infrared wavefront along a reference path and a second infrared wavefront along a measurement path contacting the measurement object, and, after the second wavefront contacts the measurement object, combines the wavefronts to produce an optical interference pattern, the first and second infrared wavefronts being derived from the broadband infrared radiation; a detector producing data in response to the optical interference pattern; and a controller which during operation causes the scanning interferometer to vary the optical path difference between the reference and measurement paths and analyzes the data as a function of the varying optical path difference.

In general, in a further aspect, the invention features an interferometry system for a measuring a thickness profile of a measurement object relative to a reference object. The interferometry system includes: a broadband infrared source which during operation generates broadband infrared radiation including central wavelengths greater than about 1 micron; a scanning interferometer which during operation directs a first infrared wavefront along a reference path passing through the reference object and a second infrared wavefront along a measurement path passing through the measurement object, and subsequently combines the wavefronts to produce an optical interference pattern, the first and second infrared wavefronts being derived from the broadband infrared radiation; a detector producing data in response to the optical interference pattern; and a controller which during operation causes the scanning interferometer to vary the optical path difference between the reference and measurement paths over a range larger than the coherence length of the broadband source and analyzes the data as a function of the varying optical path difference.

Embodiments of the interferometry system can include any of the following features. The broadband infrared radiation can include central wavelengths within the range of about 3 micron to 11 microns. The coherence length of the broadband infrared radiation can be in the range of about 10 to 100 microns.

In general, in a further aspect, the invention features an interferometry system for a measuring a thickness profile of a measurement object relative to a reference object. The interferometry system includes: a broadband infrared source which during operation generates broadband infrared radiation including central wavelengths greater than about 1 micron and having a coherence length less than about 100 microns; a scanning interferometer which during operation directs a first infrared wavefront along a reference path passing through the reference object and a second infrared wavefront along a measurement path passing through the measurement object, and subsequently combines the wavefronts to produce an optical interference pattern, the first and second infrared wavefronts being derived from the broadband infrared radiation; a detector producing data in response to the optical interference pattern; and a controller which during operation causes the scanning interferometer to vary the optical path difference between the reference and measurement paths over a range larger than the coherence length of the broadband source and analyzes the data as a function of the varying optical path difference.

In general, in a further aspect, the invention features a method for measuring the profile of a surface of a measurement object, wherein the surface appears rough at visible wavelengths. The method includes: providing broadband radiation for which the surface appears specular; directing a portion of the broadband radiation to reflect from the surface of the measurement object; directing another portion of the broadband radiation to reflect from a reference object; combining the reflected portions to form an optical interference pattern on a camera for each of multiple relative positions of the measurement object and a reference object, wherein optical path differences defined by the multiple relative positions of the measurement and reference objects span a range larger than the coherence length of the broadband radiation; and determining the surface profile based on the optical interference patterns.

Embodiments of the method can include any of the following features. The broadband radiation can include central wavelengths within the range of about 1 micron to about 20 microns. The broadband radiation can include central wavelengths within the range of about 3 micron to about 11 microns. The surface of the measurement object when illuminated with visible laser beam from a helium neon laser at normal incidence can scatter at least about 95% of the reflected laser light outside the natural divergence angle of the laser beam. The portion of broadband radiation directed to the surface of the measurement object can contact the measurement object at substantially normal incidence. The method can further include demagnifying the combined wavefronts to form the optical interference pattern on the camera. For example, the demagnification can be in the range of about 1× to about 0.1×. The field of view corresponding to the optical interference pattern can be greater than about 5 mm, e.g., in the range of about 10 mm to 100 mm. For at least one of the multiple positions, a difference in optical path to the camera from each of the measurement and reference objects can be less than zero, and for at least another of the multiple positions, a difference in optical path to the camera from each of the measurement and reference objects can be greater than zero. The other portion of the broadband radiation can be reflected from a non-flat surface of the reference object. The surface of the measurement object can be curved. The method can further include passing one of the portions through at least one compensating optic to produce a curved wavefront.

In general, in a further aspect, the invention features a method for measuring the surface profile of a measurement object. The method includes: providing broadband radiation including central wavelengths greater than about 1 micron and having a coherence length of less than about 100 microns; directing a portion of the broadband radiation to reflect from the measurement object; directing another portion of the broadband radiation to reflect from a reference object; combining the reflected portions to form an optical interference pattern on a camera for each of multiple relative positions of the measurement object and a reference object; and determining the surface profile based on the optical interference patterns.

Embodiments of the method can include any of the following features. The broadband radiation can include central wavelengths within the range of about 1 micron to about 20 microns, or more particularly, e.g., within the range of about 3 micron to about 11 microns. The coherence length of the broadband radiation can be in the range of about 10 to about 100 microns. The portion of broadband radiation directed to the surface of the measurement object can contact the measurement object at substantially normal incidence. The method can further include demagnifying the combined wavefronts to form the optical interference pattern on the camera. For example, the demagnification can be in the range of about 1× to about 01×. The field of view corresponding to the optical interference pattern can be greater than about 5 mm, e.g., in the range of about 10 mm to 100 mm. The measurement object can be partially transparent at the central wavelengths of the broadband radiation and the method further can include positioning the measurement and reference objects to produce optical interference patterns corresponding to reflections from each of front and back surfaces of the measurement object and determining the thickness profile of the measurement object based on the optical interference patterns.

In general, in a further aspect, the invention features a method for measuring the thickness profile of a measurement object relative to a reference object. The method includes: providing broadband radiation including central wavelengths greater than about 1 micron and having a coherence length of less than about 100 microns; directing a portion of the broadband radiation through the measurement object; directing another portion of the broadband radiation through the reference object; combining the portions to form an optical interference pattern on a camera for each of multiple relative positions of the measurement object and a reference object; and determining the thickness profile based on the optical interference patterns.

Embodiments of the method can include any of the following features. The broadband radiation can include central wavelengths within the range of about 1 micron to about 20 microns or, more particularly, e.g., within the range of about 3 micron to about 11 microns. The coherence length of the broadband radiation can be in the range of about 10 to about 100 microns.

In general, in a further aspect, the invention features a method for measuring a surface profile of a measurement object that appears rough at visible wavelengths. The method includes: providing broadband infrared radiation for which the measurement object appears specular; and using the broadband infrared radiation to perform scanning interferometric measurements of the surface profile.

Embodiments of the invention have many advantages.

For example, systems and methods described herein retain the advantages of scanning interferometry (such as being able to resolve large surface height variations) and, by using illumination wavelengths for which the surface of interest appear smooth, minimize the negative consequences of profiling a surface that is rough with respect to the visible wavelengths of conventional white-light, scanning interferometry. In particular, because diffuse scattering and speckle phenomena are avoided, the phase of individual interference fringes can be resolved and used to determine surface height features that are orders of magnitude smaller than the coherence length of the broadband source.

Furthermore, because the surface of interest appears specular with respect to the illumination wavelength, there are substantially no scattering losses upon reflection of the measurement wavefront from the surface of interest. As a result, even a small numerical aperture for the imaging system can capture sufficient light to produce interferograms with suitable signal-to-noise. Consequently, the field of view (FOV) for the imaging system, which in practice is often inversely related to the numerical aperture, can be made large relative to that of conventional white-light scanning interferometry of rough surfaces.

Moreover, the interferometry system can accommodate larger height gradients on the surface of interest and larger fields of view because the larger wavelengths lessen the constraints of finite pixel dimensions in the camera. In particular, to resolve a fringe, the pixel size should be smaller than the lateral dimension of the fringe on the camera. But because the interferometry system uses larger wavelengths, the height variation corresponding to the fringe is larger, therefore the system can accommodate the larger height gradients and can accordingly employ demagnification optics to image a larger field of view onto the camera.

Also, because the surface of interest appears specular with respect to the illumination wavelength, the systems and methods can benefit from a statistical averaging of surface heights within each image pixel. Thus, even when surface roughness is not resolved, which may be the case for FOVs greater than a few mm, the surface profile appears smooth and relatively free of noise associated with the surface roughness.

Also, because the systems and methods generally use longer wavelengths than those of conventional white-light scanning interferometry, they can accumulate data more quickly because the scanning stage can be many times faster for the same range of surface height. For example, when using an illumination wavelength of about 8 $\mu$m and acquiring data at quarter wavelength intervals at a camera speed of 60-Hz, the scan rate is about 60 $\mu$m of surface height per second. In contrast, when using a white-light illumination source (e.g., about 500 nm) under the same data acquisition conditions, the scan rate is only 3.75 $\mu$m per second.

Furthermore, because the systems and methods can operate at near normal incidence to the surface of interest, they can profile deeply recessed surfaces, for example, to the bottom of drilled holes.

Also, the system and methods can be used to profile front and back surfaces of objects that are substantially opaque at visible wavelengths, but become more transparent at infrared wavelengths.

Finally, the systems and methods can resolve both coarse and fine features on the surface of interest. Coarse features can be resolved by scanning the reference leg relative to the measurement leg to localize the interference between the broadband wavefronts. Fine features can be resolved by interpolating phase information with the localized interference data.

Other aspects, advantages, and features of the invention will be apparent from the following detailed description and from the claims.

BRIEF DESCRIPTION OF THE DRAWINGS

FIG. 11a is an image of a fringe pattern and FIG. 11b is a plot of the corresponding surface height profile based on analysis of multiple fringe patterns.

DETAILED DESCRIPTION

Surfaces that appear rough and generate speckle at visible wavelengths take on an entirely different appearance at longer wavelengths, e.g. in the infrared (IR). The invention features a broadband scanning interferometry system in which the illumination wavelengths are sufficiently large to cause a surface of interest to appear specular. As a result, the interferogram is free of speckle and fringe information can be used to determine surface height. In addition, the illumination wavelengths are sufficiently broadband to localize fringes to an optical path difference (OPD) between the measurement and reference paths that is within the coherence length of the illumination wavelengths. Therefore, by scanning the reference path relative to the measurement path, the broadband scanning interferometry system can unambiguously measure surface height variations including relatively large variations such as, e.g., the step of a recessed surface. Moreover, by using large wavelengths, the scanning interferometry system can accommodate large field of views and more complex surface profiles. Therefore, the scanning interferometry system is especially useful for measuring precision-engineered industrial parts, which typically have rough surfaces, including steps and discontinuities, and may have large surface areas.

Figure 1:
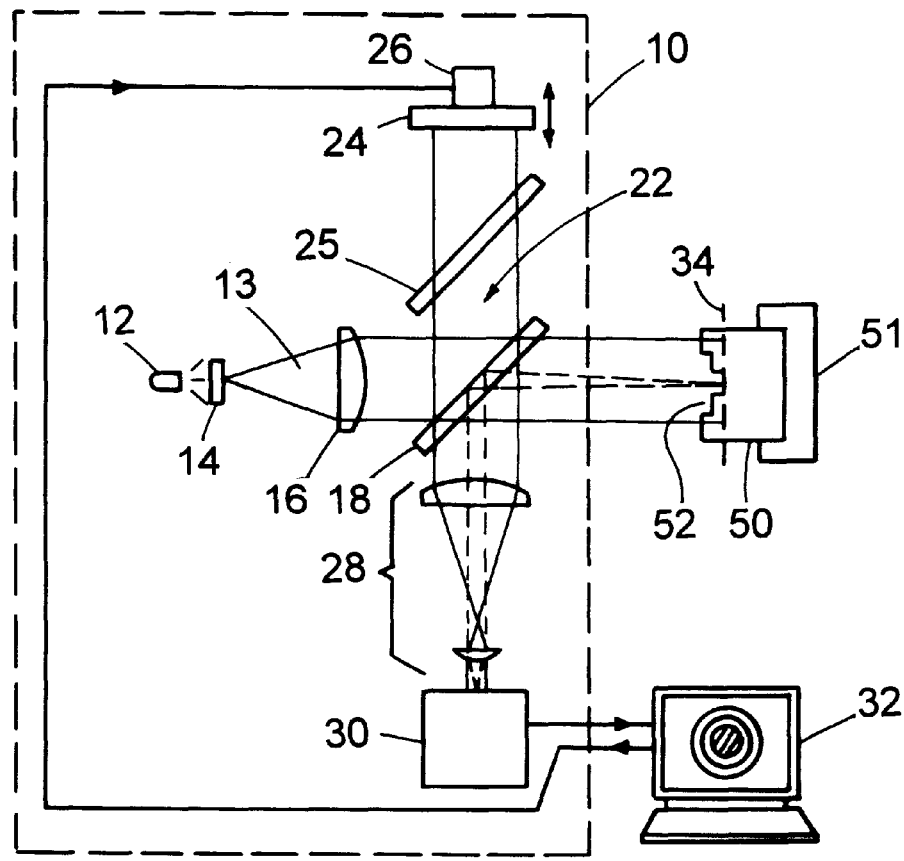
FIG. 1 is a schematic diagram of one embodiment of the broadband infrared scanning interferometer.

An embodiment of the broadband scanning interferometry system is shown in FIG. 1. A broadband scanning interferometer 10 directs a measurement wavefront 20 to a measurement object 50 having a measurement surface 52 of interest. A mount 51 supports the measurement object. As shown in FIG. 1, the surface of interest may include discontinuous steps, or otherwise large surface variations. For example, the measurement object may be an industrial part, such as for the automotive industry. In addition to having discontinuous surface steps, the surfaces of such parts typically have ground finishes that appear rough at visible wavelengths. For example, an observer looking at the rough surface at normal incidence would not see a reflection of him/herself or other objects, as one would expect from a smooth, mirror-like surface. Similarly, a visible-wavelength laser beam (e.g., a helium neon laser beam) when incident on the rough surface at normal incidence scatters over a wide range of angles. For example, for some rough surfaces, more than about 95% of the reflected laser light scatter outside the natural divergence angle of the laser beam. In the discussion that follows surface 52 is presumed to have such a rough surface, however, interferometer 10 is not limited to profiling only rough surfaces.

Interferometer 10 includes a broadband source 12 that produces radiation at wavelengths, which when used to illuminate surface 52 do not produce speckle sufficient to corrupt the phase information of an interferogram. In contrast, for example, when a rough surface is viewed by a typical interferometer, e.g., a Michelson interferometer with a field of view of 1–2 mm, using visible wavelengths, e.g., about 420 nm to about 690 nm, the interference phase and light intensity fluctuates statistically from speckle to speckle and is not correlated with the macroscopic surface shape. Many objects that appear rough and produce speckle at visible wavelengths, appear smooth and do not produce speckle at infrared wavelengths. Accordingly, in the presently described embodiment, source 12 produces radiation at such infrared wavelengths, for example, at wavelengths in a range greater than about 1 micron, or more particularly, in the range between a lower limit of any one of about 1 micron, about 2 microns, about 3 microns, about 4 microns, or about 8 microns and an upper limit of any one of about 10 microns, about 11 microns, about 20 microns, or about 25 microns.

The radiation produced by source 12 is also sufficiently broadband to provide a limited coherence length, and thereby permit scanning of the relative path lengths of the measurement and reference legs to localize a selected range of measurement planes in the measurement object. A suitable range corresponds to that sufficient to resolve surface height discontinuities in surface 52. For example, for many measurement objects of interest, source 12 suitably provides radiation having a coherence length less than about 100 microns, e.g., in the range of about 10 to about 100 microns.

Suitable sources for source 12 include, for example, a multimode carbon dioxide laser, a multimode, infrared helium neon laser, an infrared diode laser, an infrared light emitting diode, a thermal source such as that produced by passing current through a metal or ceramic filament, by heating glass as in a halogen bulb, or by using a chemical source, spark plugs, or diesel engine glow plugs.

In the present example, referring again to FIG. 1, source 12 is a filament producing broadband infrared radiation 13 having a wavelength in the range of about 8 to 10 microns. Radiation 13 passes through a diffuser 14 and a lens 16 to produce collimated infrared radiation, which then contacts a beam splitter 18. The beam splitter transmits a portion of the radiation to produce a measurement wavefront 20 and reflects another portion to produce a reference wavefront 22. Measurement wavefront 20 reflects from measurement surface 52 and returns to beam splitter 18. Similarly, reference wavefront 22 reflects from a reference mirror 24 supported by a stage 26 and returns to beam splitter 18. The beam splitter then combines the return measurement and reference wavefronts and directs them toward imaging optics 28, which direct the combined wavefronts onto an infrared camera 30 where they form an interferogram. The reference leg of interferometer 10 further includes a compensator plate 25, which compensates for reference wavefront 22 passing through beam splitter 18 only one time, whereas measurement wavefront 20 passes through beam splitter 18 three times.

In the present example, camera 30 includes a two-dimensional array of pixels responsive to radiation at the wavelengths produced by source 12. Camera 30 thus produces a digital image of the interferogram and sends it to a computer 32 for analysis. Suitable cameras 30 include, e.g., a microbolometer or cooled InSb array, a vidicon camera, or another thermal imaging camera. Band pass filters can be used to select appropriate spectral ranges for the camera.

Computer 32 is also connected to stage 26. Under computer control, stage 26 varies the position of reference mirror 24 to control the relative optical path difference between the reference and measurement wavefronts and thereby select a measurement plane 34 within the surface profile of surface 52. Because of the limited coherence length of the radiation in the reference and measurement wavefronts, interference in the interferogram is only present at points where the optical path difference (OPD) between the reference and measurement wavefronts is within the coherence length of the radiation. In the present example, reference mirror 24 is flat and its position defines a zero OPD plane in the measurement leg, as indicated, e.g., by measurement plane 34. Therefore, portions of surface 52 that are at a distance from measurement plane 34 greater than the coherence length do not produce any corresponding interference in the interferogram produced at camera 30. By scanning the position of reference mirror 24, scanning interferometer 10 can adjust the position of measurement plane 34 and unambiguously resolve discontinuous or otherwise large variations in the profile of surface 52. In the present example, stage 26 is a piezoelectric transducer (PZT), however, in other embodiments, for example, stage 26 can be a mechanical stage to permit a larger range of measurement plane positions than that of a PZT. In further embodiments, stage 26 can include a mechanical stage for coarse adjustments and a PZT for fine adjustments.

Figure 2:
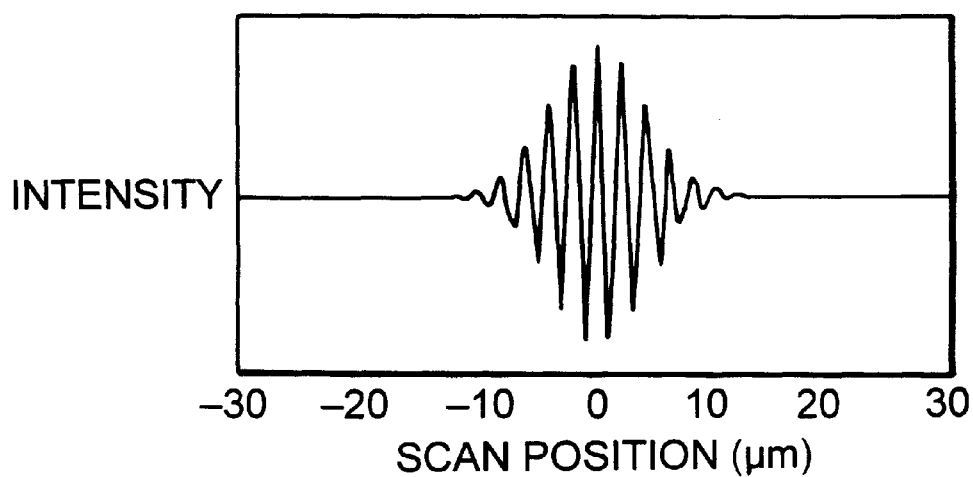
FIG. 2 is a graph of interference data as a function of scan position for a single camera pixel.

During operation, camera 30 records the interferogram produced by the measurement and reference wavefronts for multiple positions of the reference mirror, e.g., as a result of scanning the reference mirror. Computer 32 analyzes the interference data from each pixel as a function of the scan position to determine absolute height variations of surface 52. FIG. 2 illustrates representative interference data measured by a single pixel as a function of the scan position. The interference fringes are localized to within the coherence length of the source at a scan position that corresponds to a zero optical-path difference (OPD) position for the corresponding points on the measurement and reference objects that are imaged onto the pixel. The fringe localization unambiguously indicates when the measurement plane intersects the object point on surface 52 corresponding to the image pixel. Absolute height variations across the field of view (FOV), therefore, can be determined by comparing the scan position that localizes fringes for each pixel. For example, one approach is to determine the scan position of peak fringe contrast. Suppose, for example, interference data for a first pixel looks as in FIG. 2, with a peak fringe contrast at a scan position of 0 $\mu$m. A second pixel might have a peak fringe contrast at a different scan position, for example, 10 $\mu$m. The absolute height difference between the two object points corresponding to these image pixels would therefore be 10 $\mu$m. Accordingly, the fringe contrast data provides a "coarse" measurement of the absolute height profile. See, e.g., Deck in U.S. Pat. No. 5,402,234, the contents of which are incorporated herein by reference, and which discloses more detailed methods for performing the scanning interferometry.

Moreover, because there is no speckle, the interference data can also be used to determine "fine" surface height features by comparing the phase of the interference fringes between adjacent pixels as in more conventional interferometry. See, for example, Ai et al. in U.S. Pat. No. 5,471,303, which combines scanning and phase-shifting interferometry. Alternatively, for example, one may process the data entirely in terms of broadband interference phases, using the frequency-domain analysis procedure disclosed by de Groot in U.S. Pat. No. 5,398,113, the contents of which are incorporated herein by reference. Regardless of the particular analysis method, by using the infrared illumination wavelengths to make the surface of interest appear smooth and minimize speckle, the acquired interference data includes phase information sufficient to determine fine surface height variations using interferometry techniques known in the art.

In the embodiment of FIG. 1, scanning interferometer 10 is a Michelson-type interferometer, however, in other embodiments different types of interferometers can be used. For example, the scanning interferometer can also be a Twyman-Green interferometer, which is capable of profiling lenses or other non-flat surfaces, or a Mirau interferometer, which is useful for smaller fields of view, e.g., in microscope applications. In general, the interferometer combines reference and measurement wavefronts and is capable of accessing a zero OPD plane to facilitate coherence scanning. Accordingly, unequal path length interferometers such as Fizeau interferometers are generally not suitable unless they are configured to generate a coherence peak at a non-zero OPD position, such as, e.g., by introducing a comb filter in the spectrum of the source to provide periodic coherence peaks.

Figure 3:
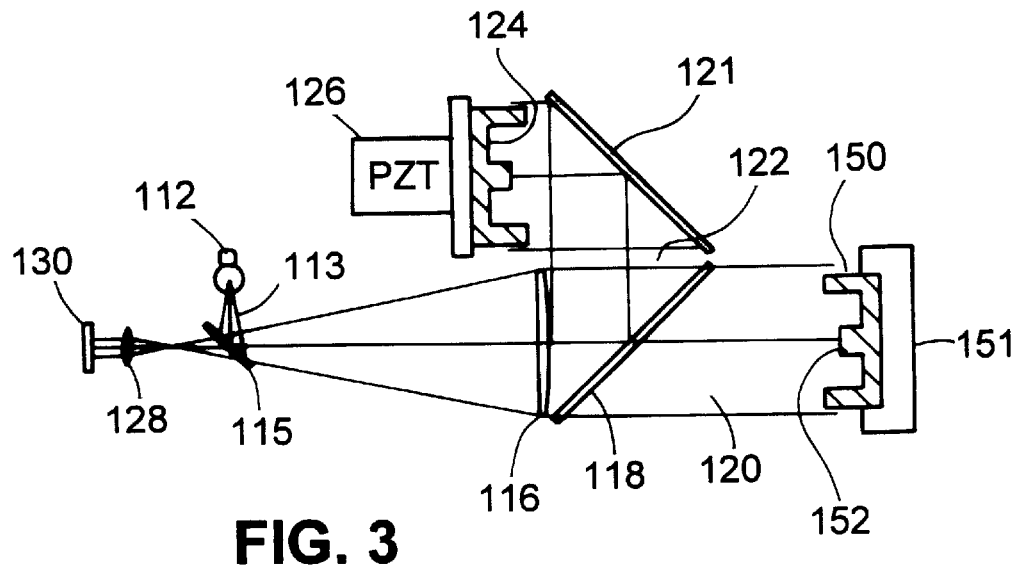
FIG. 3 is a schematic diagram of an embodiment of the broadband scanning interferometer in which the reference object has a structured surface profile.

Furthermore, in the embodiment of FIG. 1, the reference object is a flat reference mirror (reference mirror 24), however, in other embodiments, the reference object can have a non-flat or structured profile, in which case the absolute height measurements determined from the interference data is relative to the surface profile of the reference object. Such an embodiment is shown in FIG. 3, where source 112 directs radiation 113 to a beam splitter 115, which directs the radiation to collimating lens 116. Another beam splitter 118 splits the collimated radiation into a measurement wavefront 120 and a reference wavefront 122. The measurement wavefront then reflects from the measurement surface 152 of measurement object 150, which is supported by mount 151, while the reference wavefront is directed by mirror 121 to a non-flat reference surface 124, which then reflects the reference wavefront back to beam splitter 118. Beam splitter 118 then combines the reflected measurement and reference wavefronts and directs them to imaging optics 128, which direct the combined wavefronts onto camera 130 where they form an interferogram that is recorded by camera 130 and analyzed by a computer (not shown). A PZT stage 126 supports non-flat reference surface 124 and is controlled by the computer to vary the OPD between the measurement and reference paths to permit scanning analysis. In the embodiment shown in FIG. 3, reference surface 124 has a profile substantially identical to the measurement surface 152, and is the "master" to which the measurement surface is directly compared.

Figure 4:
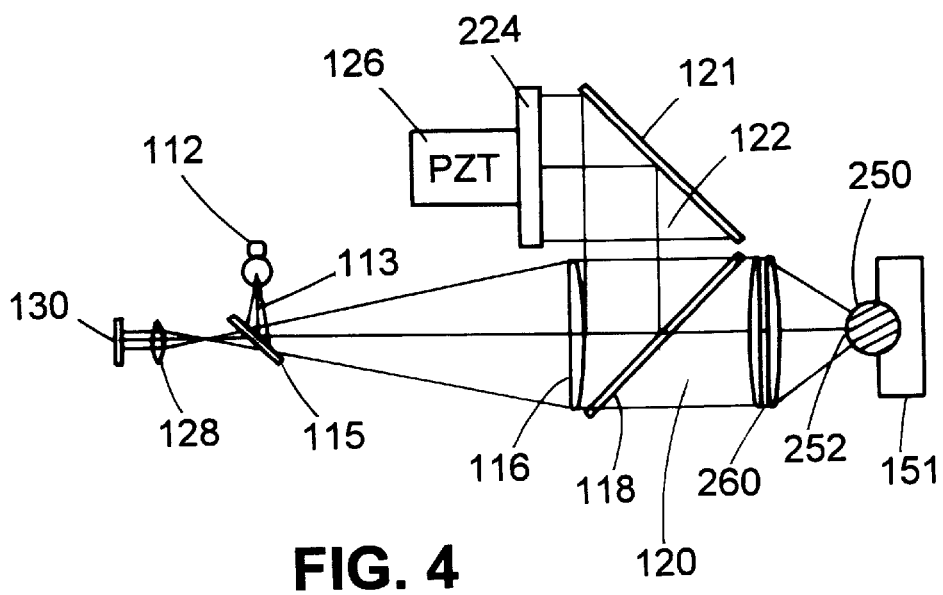
FIG. 4 is a schematic diagram of an embodiment of the broadband scanning interferometer configured to measured curved measurement surfaces.

In other embodiments, a flat reference mirror can be used in conjunction with reflective or transmissive corrective optics such as a lens, diffractive optical element (DOE) or a digital hologram to accommodate non-flat surfaces of interest, e.g., aspheres. Such an embodiment is shown in FIG. 4, which is includes components identical to the interferometer of FIG. 3, except that the reference surface 224 is flat, the surface of interest 252 of the measurement object 250 is curved, e.g., it is a sphere, asphere, or cylinder, and the interferometer includes compensating optics 260 that correct for the ideal curvature of surface 252. As a result, the interferometer compares the actual surface profile of surface 252 to its ideal surface profile. Alternatively, in other embodiments, the compensating optics can be positioned in the reference leg rather than in the measurement leg of the interferometer. Because the interferometer operates at infrared wavelengths, such compensating optics are easier to fabricate because their feature sizes are larger than those necessary for operation at visible wavelengths.

Because the scanning interferometer operates at infrared wavelengths, there are fewer constraints on the imaging optics that image the combined wavefronts onto the camera. For example, because the measurement surfaces appear specular at the infrared wavelengths, there are substantially no scattering losses. Accordingly, even a modest numerical aperture is sufficient for the imaging optics to deliver light to the camera and achieve an acceptable signal-to-noise ratio. Because the numerical aperture can be smaller than it would be in the presence of scattering, the field of view, which is generally inversely related to numerical aperture, can be correspondingly larger. Furthermore, because the interferometer operates at infrared wavelengths, a single interference fringe corresponds to a larger height displacement than that corresponding to visible wavelengths. Accordingly, a larger field of view (FOV) than that corresponding to visible wavelengths can be imaged onto the detector without being constrained by finite pixel dimensions. Similarly, the interferometer can accommodate larger surface slopes, such as may be present in more complex or aspheric surface profiles, than that permitted by a visible wavelength because of finite pixel dimensions.

Thus, for surfaces that are rough at visible wavelengths, the infrared scanning interferometer substantially eliminates the negative effects of speckle, permitting absolute height measurements with interferometric accuracy, and is capable of large FOVs. For example, the interferometer can have a FOV greater than about 5 mm, or more particularly, in the range of about 10 mm to 100 mm or even larger, although the interferometer can also operate at smaller FOVs. Accordingly, imaging optics 28 (e.g., one or more lenses and/or curved mirrors) can demagnify the measurement and reference wavefronts so that the camera can record an interferogram corresponding to a large FOV. For example, the imaging optics can have a magnification factor of between 1× and 0.1×, in other words the imaging optics can demagnify the object space images (which correspond to the measurement and reference surfaces) by up to a factor of 10. Nonetheless, the interferometer is not limited to embodiments in which the imaging optics demagnify the wavefronts, other magnifications are also possible.

Figure 5:
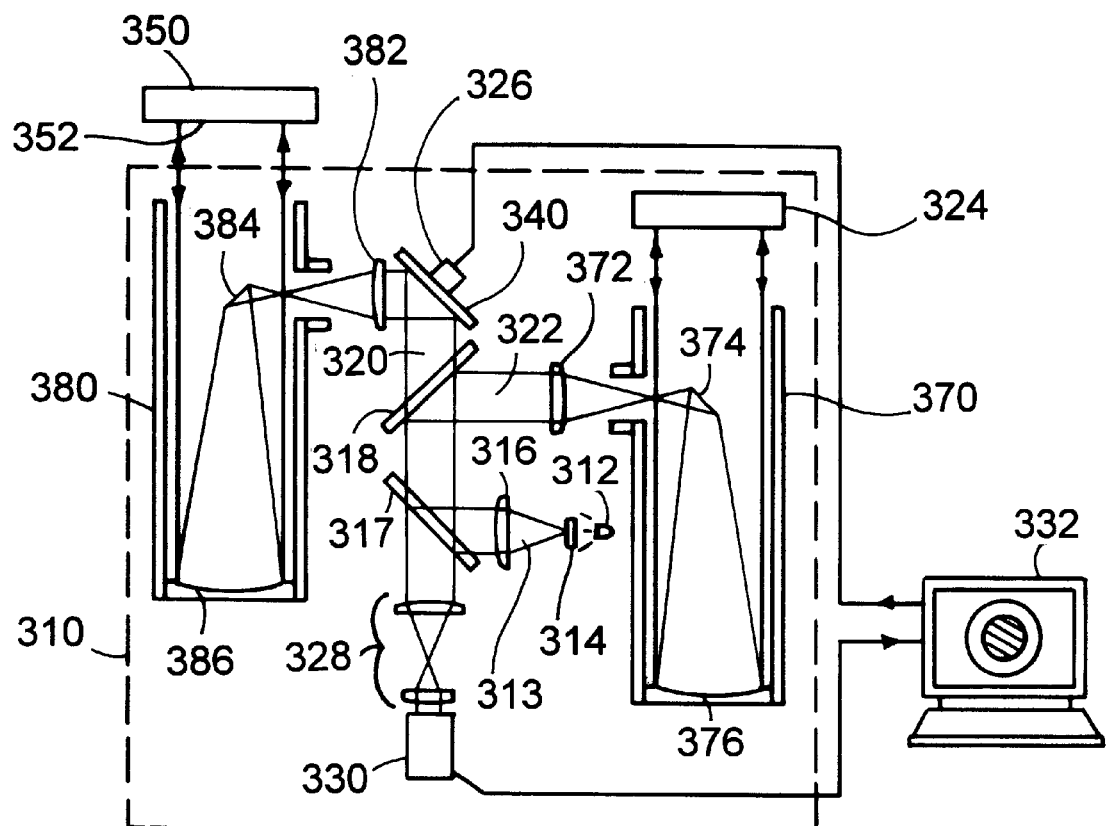
FIG. 5 is a schematic diagram of an embodiment of the broadband infrared scanning interferometer in which reflective beam-expansion optics are used to expand the field of view.

FIG. 5 is a schematic diagram of an embodiment of the invention having a very large field of view. This embodiment accommodates rough-surface objects of several hundred mm in diameter, by means of reflective beam-expansion optics similar to those employed in astronomical telescopes. Referring to FIG. 5, the interferometer 310 includes two such telescopes 370 and 380, one for the reference leg and one for the measurement leg, otherwise the interferometer is similar to the system shown in FIG. 1. Referring again to FIG. 5, a source 312 generates broadband infrared radiation 313 that passes through a diffuser 314 and a collimating lens 316, after which a first beam splitter 317 reflects the radiation to a second beam splitter 318, which splits the radiation into a measurement wavefront 320 and a reference wavefront 322. Beam splitter 318 reflects the reference wavefront towards telescope 370, which in the presently described embodiment includes lens 372, mirror 374, and curved reflector 376. Similarly, beam splitter 318 transmits the measurement wavefront to fold mirror 340 and onto telescope 380, which in the presently described embodiment includes lens 382, mirror 384, and curved reflector 386. Other embodiments of the beam expansion telescopes may include different optical arrangements and/or different components, such as is well known in the optical arts. The reference wavefront is focused by lens 372 and subsequently expands as it is redirected by mirror 374 towards curved reflector 376, which collimates the expanded wavefront and directs it to reference mirror 324, which then reflects the expanded wavefront back through the telescope. Similarly, the measurement wavefront is focused by lens 382 and subsequently expands as it is redirected by mirror 384 towards curved reflector 386, which collimates the expanded wavefront and directs it to a surface of interest 352 on a measurement object 350, which then reflects the expanded wavefront back through the telescope. Beam splitter 318 combines the reflected measurement and reference wavefronts, which are transmitted by beam splitter 317 and imaged onto camera 330 by imaging optics 328. In the presently described embodiment, scanning of the OPD between the reference and measurement wavefronts is achieved by means of a piezoelectric transducer 326 connected to fold mirror 340. In other embodiments, the scanning can be accomplished by scanning reference mirror 324, as in the previously described embodiments, or by scanning any other part of one of the reference or measurement paths relative to the other of the reference or measurement paths. A computer 332 is connected to transducer 326 and camera 330, and analyzes the interference fringes recorded by the camera.

Applications of any of the infrared broadband scanning interferometry systems described herein are not limited to those in which the measurement surface appears smooth at infrared wavelengths and rough at visible wavelengths. Even for surfaces that appear smooth at visible wavelengths, the interferometer can be used to exploit its other advantages described herein, such as larger FOV, increased surface slope acceptance, increased scanning rates, and absolute height measurement.

In another application, the scanning interferometer can be used to profile multiple surfaces of objects made of materials that may be substantially opaque at visible wavelengths, but are more transparent in the infrared. For example, the scanning interferometer can be used to determine the front and back surface profiles of a silicon wafer, as well as the absolute thickness profile of the wafer. This is possible, even though silicon is substantially opaque at visible wavelengths. In particular, where the silicon wafer is partially transparent, there are reflections of the measurement wavefront from both the front and back surfaces of the wafer. In other words, the interferometer can view the back surface through the thickness of the measurement object. Because the source is broadband, the interference between each of the reflections from the front and back surfaces and the reference wavefront can be separated from one another by scanning the measurement plane to select either the front or back surfaces of the silicon wafer. Moreover, such scanning correlates the measurements of the front and back surfaces to provide absolute thickness information. Furthermore, because of the infrared wavelengths, the surface and thickness profiles can be measured even when the surfaces appear rough at visible wavelengths, as is typically the case for production silicon wafers.

The interferometry system of FIG. 1 can be used for such measurements, with measurement object 50 being replaced with the partially transparent measurement object, e.g., the silicon wafer. For silicon, suitable wavelengths produced by source 12 include those in any of the following ranges: from 1.2 to 6 microns (about 50% transmission); 9 to 11 microns (about 20% transmission); and above 20 microns (about 50% transmission). A scan of the measurement plane 34 that encompasses the front surface of the wafer produces a profile $h_1$ of the front surface 52, and the limited coherence of the broadband source radiation eliminates the effects of internal reflections within the wafer on the interference signal. Similarly, a scan of the measurement plane that encompasses the back surface 54 produces a profile $h'_2$ representing the sum of the actual back surface profile $h_2$ and the optical thickness of the wafer. Accordingly, $$h'_2(x,y) = h_2(x,y) + (n-1)T(x,y) \qquad (1),$$

where T is the thickness profile, equal to the difference between the front and back surface profiles $h_1$ and $h_2$, and n is the index of refraction of the wafer material. If the index of the material is known, it is then possible to calculate the back-surface profile alone using to formula $$h_2 = \frac{h'_2 - (n-1)h_1}{n}. \qquad (2)$$

Figure 6A:
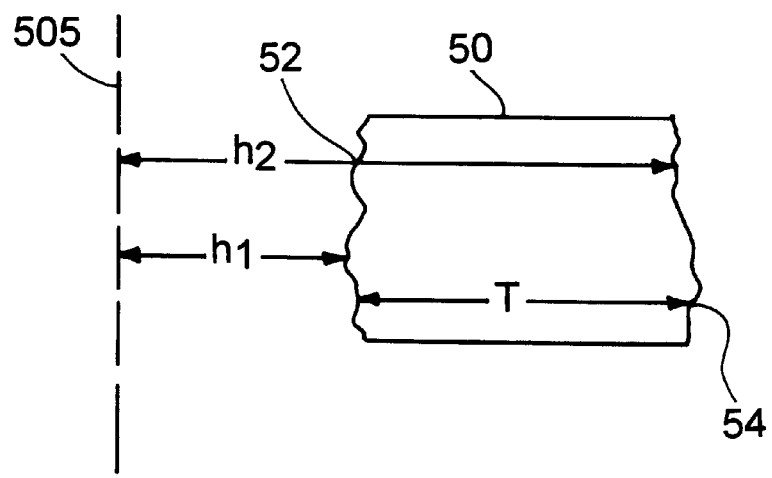
FIG. 6a is a schematic diagram of the height profiles of the front and back surfaces of a partially-transparent measurement object.

The thickness profile can be calculated from the difference between $h_1$ and $h_2$. Both $h_1$ and $h_2$ are defined with respect to a reference plane 505, as shown in FIG. 6a. Of course, even when the silicon wafer is opaque at the wavelength of the radiation produced by source 12, the interferometry system can still be used to measure the front surface profile of the wafer.

Figure 6B:
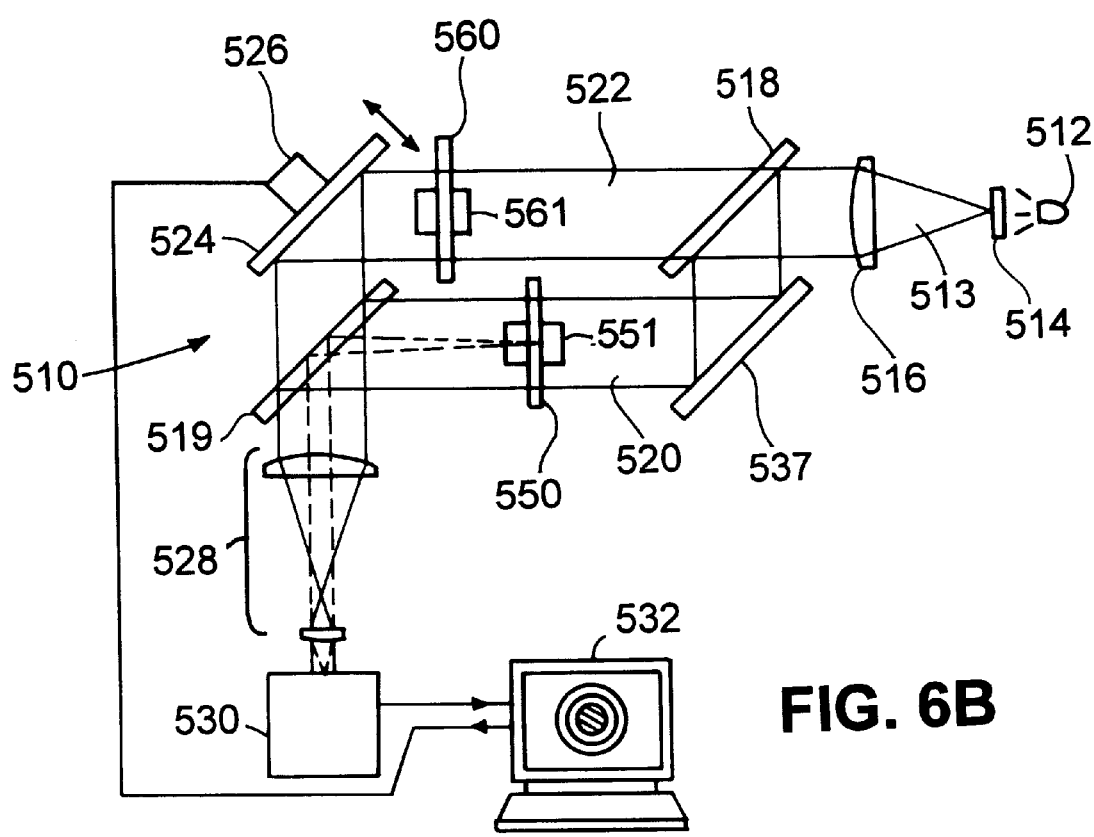
FIG. 6b is a schematic diagram of another embodiment of the broadband scanning interferometer, which is suitable for comparing the thickness profile of two objects.

Another embodiment for measuring the thickness of a measurement object is shown in FIG. 6b. This embodiment employs a Mach-Zehnder type interferometer 510 including a broadband infrared source 512. The source directs broadband infrared radiation 513 through a diffuser 514 to a collimating lens 516 and onto a beam splitter 518, which separates the radiation into measurement and reference wavefronts 520 and 522, respectively. Reference wavefront 522 passes through a transparent, or partially transparent, reference object 560, whereas measurement wavefront 520 passes through a transparent, or partially transparent measurement object 550 after being redirected by mirror 537. Mounts 551 and 561 support the measurement and reference objects 550 and 560, respectively, and are positioned below the wavefront paths. Another beam splitter 519 recombines the measurement and reference wavefronts, after the reference wavefront is redirected by reference mirror 524, which is connected to scanning stage 526. Imaging optics 528 direct the combined wavefronts onto camera 530 to form an interferogram. The camera and scanning stage are connected to a computer 532 to perform scanning interferometry measurements. In this embodiment, the reference and measurement objects respectively introduce a path length to the reference and measurement wavefronts equal to their respective optical thicknesses. Thus, the interferometric data directly relates to the difference in absolute thickness profile between the two objects, e.g., silicon wafers, one of which may be considered to be the "master" or calibration wafer. The thickness difference is weighted by n−1, where the index n is typically approximately equal to 3.4 (for silicon). The thickness difference measurement is possible, even if the object surfaces appear rough at visible wavelengths and/or the objects are opaque at visible wavelengths.

In the embodiments described herein the computer controls the scanning stage and the camera to obtain the interference data as a function of scan positions, and further analyzes the interference data to determine the absolute height profile of the surface of interest. The computer can generally be considered an electronic controller for the system, which can include hardware, software, or a combination of both to control the other components of the system and to analyze the interference data. The analysis steps can be implemented in computer programs using standard programming techniques. Such programs are designed to execute on programmable computers each comprising a processor, a data storage system (including memory and/or storage elements), at least one input device, and least one output device, such as a display or printer. The program code is applied to input data (e.g., the interferograms from the camera) to perform the interferometry analysis and generate output information (e.g., a surface height profile), which is applied to one or more output devices (e.g., a monitor). Each such computer program can be implemented in a high-level procedural or object-oriented programming language, or an assembly or machine language. Furthermore, the language can be a compiled or interpreted language. Each such computer program can be stored on a computer readable storage medium (e.g., CD ROM or magnetic diskette) that when read by a computer can cause the processor in the computer to perform the interferometry analysis. For example, MetroPro™ software available from Zygo Corporation (Middlefield, Conn.) can be used for the interferometry analysis.

The invention is further illustrated by the following non-limiting examples.

Figure 7:
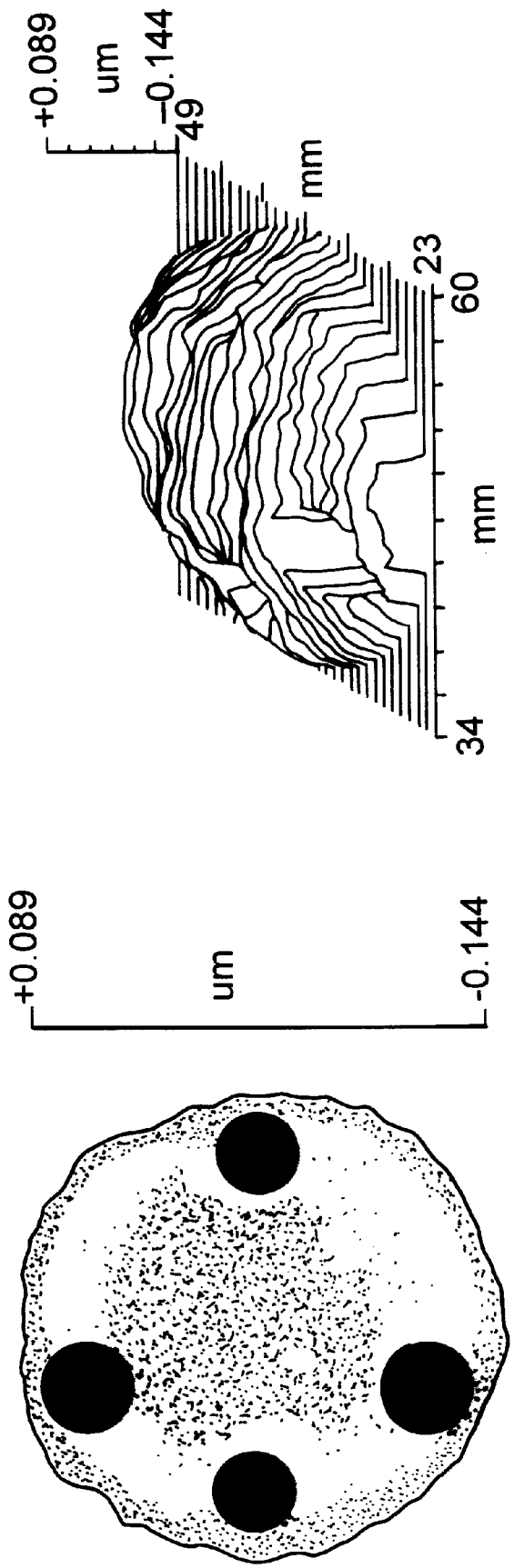
FIG. 7 is a plot a surface profile of a 35-mm automotive part having a rough surface measured by the scanning interferometer of FIG. 1.

The broadband scanning interferometry system shown in FIG. 1 was used to profile 35-mm diameter automotive parts having surface roughness large enough to generate speckle at visible wavelengths. FIG. 7 shows a representative flatness measurement for one of the parts. Because the rough parts are specular at the infrared wavelengths of the source, the surface height profile is easily measured with nanometer resolution.

In another example, the same scanning interferometer was used to measure surface profiles of two wheel components for an automobile, a wheel spindle and a wheel mating surface.

Figure 8A:
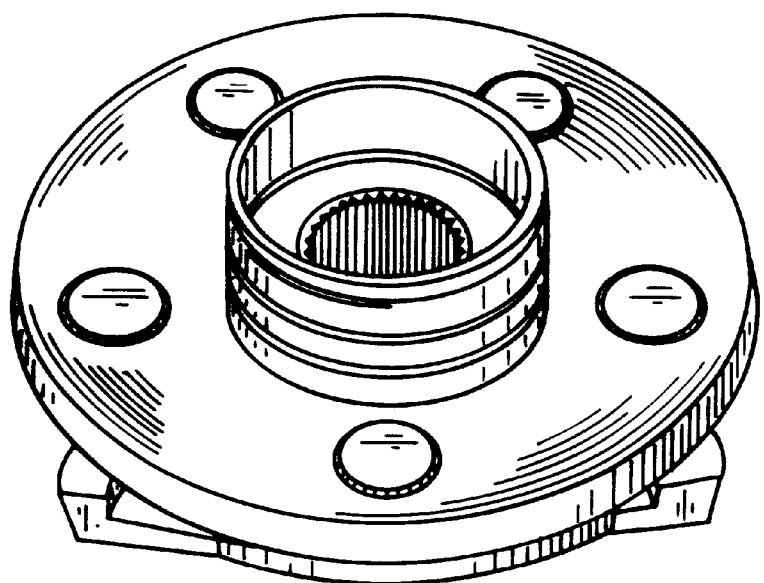
FIGS. 8a and 8b are photographs of a wheel spindle (8a) and its surface structure detail (8b).
Figure 8B:
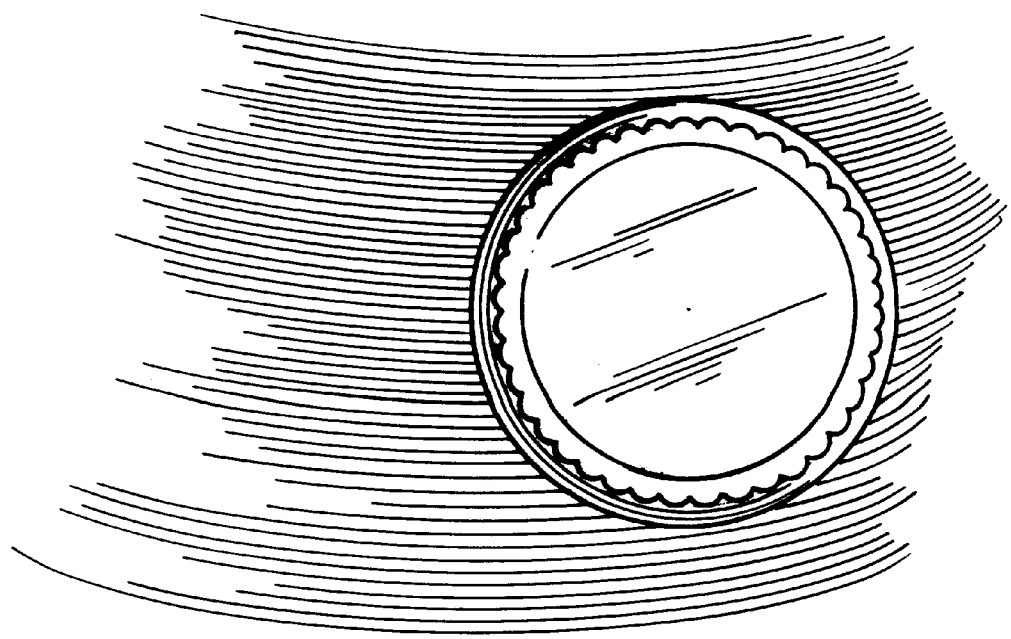
Figure 9A:
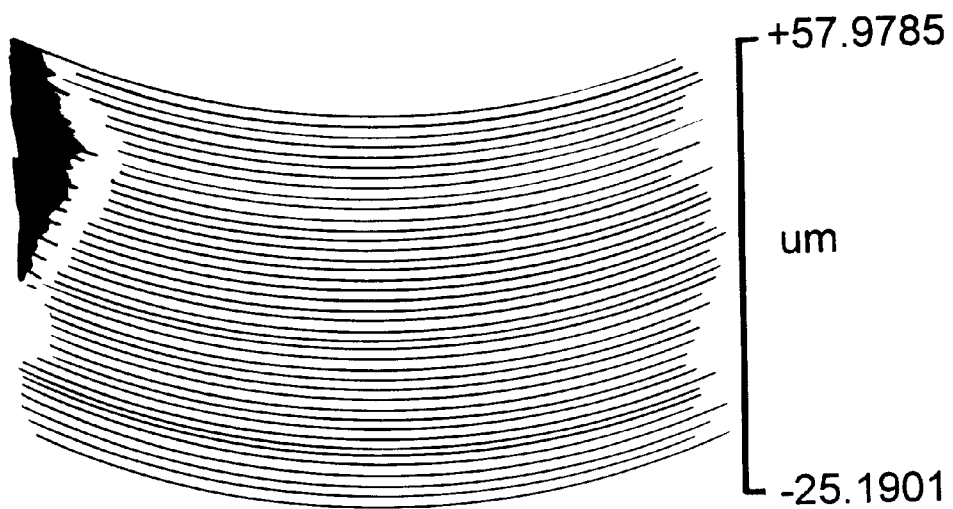
FIGS. 9a and 9b plots of the surface height profiles corresponding to regions of the surface of the wheel spindle determined using the broadband infrared scanning interferometer of FIG. 1.
Figure 9B:
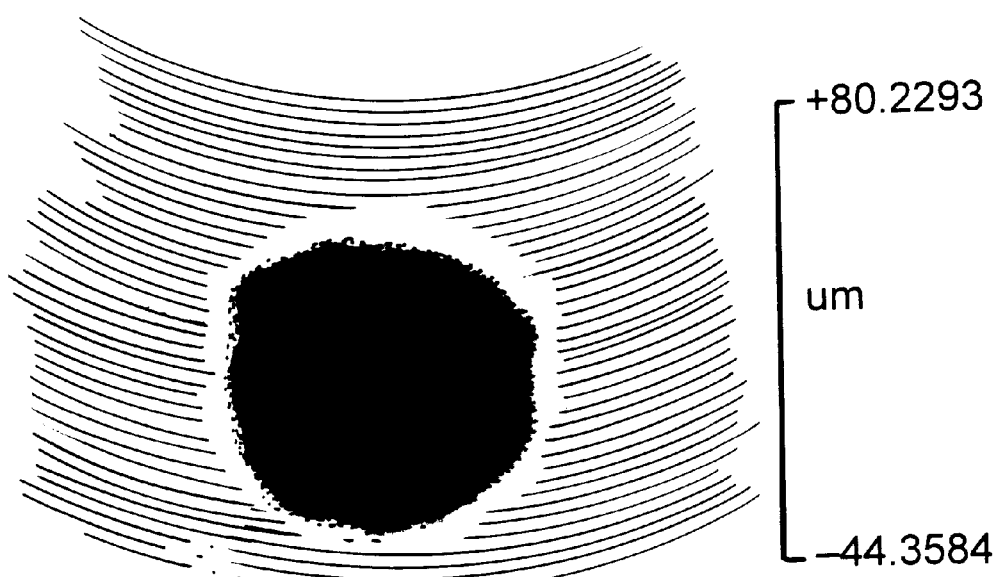

The wheel spindle defines the surface against which the wheel is mounted. It is about 5 inches and is shown in FIG. 8a. FIG. 8b illustrates the surface detail of the spindle. Even though the surface is relatively smooth, the manufacturing process leaves deep grooves on the surface of the spindle, which make it difficult to perform standard interferometry at visible wavelengths because the large height variations produce fringe spacings smaller than the camera pixel size for most typical imaging conditions. There are also problems with prior-art techniques based on IR laser Fizeau interferometry because the deep grooves result in discontinuities in the fringe pattern that result in unacceptable fringe order ambiguities. However, the IR scanning interferometer described herein, which in this example utilized a broadband 10-micron source, provides unambiguous surface profile maps as shown in FIGS. 9a and 9b for two different regions of the spindle.

Figure 10:
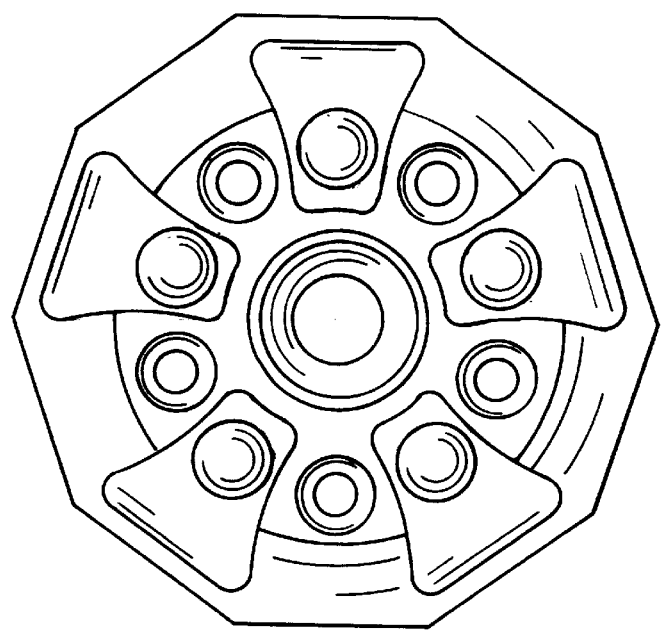
FIG. 10 is a photograph of a flat mating portion of a wheel.
Figure 11A:
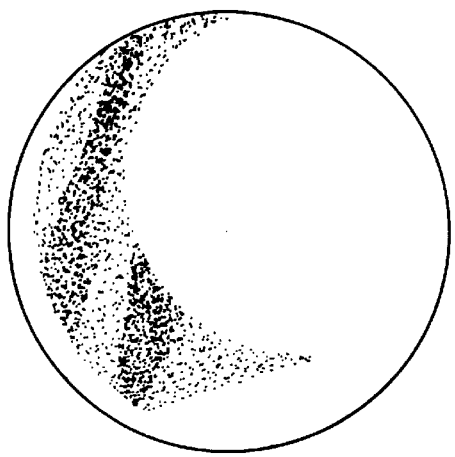
FIGS. 11a and 11b show measurements of the flat mating portion of FIG. 10 using the broadband infrared scanning interferometer of FIG. 1.
Figure 11B:
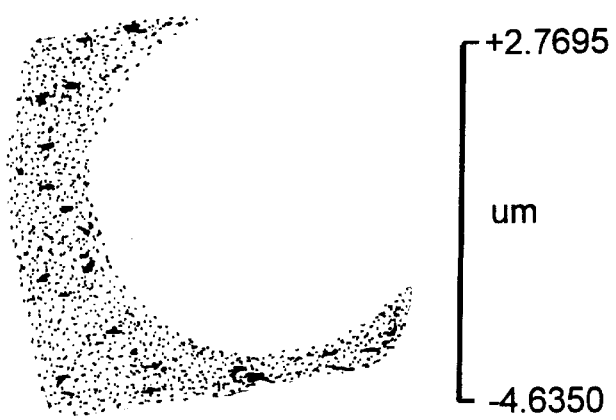

The wheel-mating surface was about 6.5-inches wide and is shown in FIG. 10. Its surface was much rougher than that of the first component and generates fully developed speckle when illuminated with visible light. However, by using the infrared, broadband scanning interferometry system, the surface no longer appeared rough at 10 microns, and it produced the fringe pattern shown in FIG. 11a and the corresponding surface profile shown in FIG. 11b upon analysis of multiple such fringe patterns.

These examples show that the infrared scanning interferometry system can make accurate measurements of surfaces that are rough and/or have large surface structure, and do so over relatively large fields of view.

Other aspects, advantages, and embodiments are within the scope of the following claims.

What is claimed is:

1. An interferometry system for a measuring a surface profile of a measurement object, the interferometry system comprising:
   a broadband infrared source which during operation generates broadband infrared radiation comprising central wavelengths greater than about 1 micron;
   a scanning interferometer which during operation directs a first infrared wavefront along a reference path and a second infrared wavefront along a measurement path contacting the measurement object, and, after the second wavefront contacts the measurement object, combines the wavefronts to produce an optical interference pattern, the first and second infrared wavefronts being derived from the broadband infrared radiation;
   a detector producing data in response to the optical interference pattern; and
   a controller which during operation causes the scanning interferometer to vary the optical path difference between the reference and measurement paths over a range larger than the coherence length of the broadband source and analyzes the data as a function of the varying optical path difference to determine the surface profile.

2. The system of claim 1, wherein the broadband infrared radiation comprises central wavelengths within the range of about 3 micron to 11 microns.

3. The system of claim 1, wherein the coherence length of the broadband infrared radiation is in the range of about 10 to 100 microns.

4. The system of claim 2, wherein the coherence length of the broadband infrared radiation is in the range of about 10 to 100 microns.

5. The system of claim 1 further comprising a mount configured to support the measurement object at substantially normal incidence to the measurement path.

6. The system of claim 5, wherein the scanning interferometer can produce a zero optical path difference between the measurement and reference paths.

7. The system of claim 1, wherein the interferometer comprises at least one imaging optic which during operation directs the combined wavefronts onto the detector to form the optical interference pattern.

8. The system of claim 7, wherein the imaging optics are configured to demagnify the surface of the measurement object with respect to the optical interference pattern formed on the detector.

9. The system of claim 8, wherein the demagnification is in the range of about 1× to about 0.1×.

10. The system of claim 1, wherein the interferometer produces a field of view on the detector greater than about 5 mm.

11. The system of claim 1, wherein the interferometer produces a field of view on the detector in the range of about 10 mm to 100 mm.

12. The system of claim 1, wherein the interferometer comprises a reference mirror positioned along the reference path and a translation stage supporting the reference mirror, the translation stage being connected to the controller for varying the optical path difference between the reference and measurement paths.

13. The system of claim 1, where the interferometer comprises a reference mount configured to support a reference object having a surface contacted by the reference path.

14. The system of claim 13, wherein the interferometer further comprises the reference object, wherein the reference object is a flat mirror.

15. The system of claim 13, wherein the interferometer further comprises the reference object, wherein the reference object has a shaped reflective surface.

16. The system of claim 1, wherein the interferometer comprises a beam splitter positioned to separate the broadband infrared radiation into the first and second infrared wavefronts and at least one compensating optic positioned along the measurement path to cause curvature in the second infrared wavefront.

17. The system of claim 1, wherein during operation the controller determines the thickness profile of the measurement object based on optical interference pattern data corresponding to reflections of the second infrared wavefront from front and back surfaces of the measurement object.

18. An interferometry system for a measuring a surface profile of a measurement object, the interferometry system comprising:
   a broadband infrared source which during operation generates broadband infrared radiation comprising central wavelengths greater than about 1 micron, the broadband infrared radiation having a coherence length of less than 100 microns;
   a scanning interferometer which during operation directs a first infrared wavefront along a reference path and a second infrared wavefront along a measurement path contacting the measurement object, and, after the second wavefront contacts the measurement object, combines the wavefronts to produce an optical interference pattern, the first and second infrared wavefronts being derived from the broadband infrared radiation;
   a detector producing data in response to the optical interference pattern; and
   a controller which during operation causes the scanning interferometer to vary the optical path difference between the reference and measurement paths and analyzes the data as a function of the varying optical path difference.

19. An interferometry system for a measuring a thickness profile of a measurement object relative to a reference object, the interferometry system comprising:
   a broadband infrared source which during operation generates broadband infrared radiation comprising central wavelengths greater than about 1 micron;
   a scanning interferometer which during operation directs a first infrared wavefront along a reference path passing through the reference object and a second infrared wavefront along a measurement path passing through the measurement object, and subsequently combines the wavefronts to produce an optical interference pattern, the first and second infrared wavefronts being derived from the broadband infrared radiation;

a detector producing data in response to the optical interference pattern; and a controller which during operation causes the scanning interferometer to vary the optical path difference between the reference and measurement paths over a range larger than the coherence length of the broadband source and analyzes the data as a function of the varying optical path difference.

20. The system of claim 19, wherein the broadband infrared radiation comprises central wavelengths within the range of about 3 micron to 11 microns.

21. The system of claim 19, wherein the coherence length of the broadband infrared radiation is in the range of about 10 to 100 microns.

22. An interferometry system for a measuring a thickness profile of a measurement object relative to a reference object, the interferometry system comprising:

a broadband infrared source which during operation generates broadband infrared radiation comprising central wavelengths greater than about 1 micron and having a coherence length less than about 100 microns;

a scanning interferometer which during operation directs a first infrared wavefront along a reference path passing through the reference object and a second infrared wavefront along a measurement path passing through the measurement object, and subsequently combines the wavefronts to produce an optical interference pattern, the first and second infrared wavefronts being derived from the broadband infrared radiation;

a detector producing data in response to the optical interference pattern; and a controller which during operation causes the scanning interferometer to vary the optical path difference between the reference and measurement paths over a range larger than the coherence length of the broadband source and analyzes the data as a function of the varying optical path difference.

23. A method for measuring the profile of a surface of a measurement object, wherein the surface appears rough at visible wavelengths, the method comprising:

providing broadband radiation for which the surface appears specular;

directing a portion of the broadband radiation to reflect from the surface of the measurement object;

directing another portion of the broadband radiation to reflect from a reference object;

combining the reflected portions to form an optical interference pattern on a camera for each of multiple relative positions of the measurement object and a reference object, wherein optical path differences defined by the multiple relative positions of the measurement and reference objects span a range larger than the coherence length of the broadband radiation; and determining the surface profile based on the optical interference patterns.

24. The method of claim 23, wherein the broadband radiation comprises central wavelengths within the range of about 1 micron to about 20 microns.

25. The method of claim 23, wherein the broadband radiation comprises central wavelengths within the range of about 3 micron to about 11 microns.

26. The method of claim 23, wherein the coherence length of the broadband radiation is in the range of about 10 to about 100 microns.

27. The method of claim 23, wherein the surface of the measurement object when illuminated with visible laser beam from a helium neon laser at normal incidence scatters at least about 95% of the reflected laser light outside the natural divergence angle of the laser beam.

28. The method of claim 23, wherein the portion of broadband radiation directed to the surface of the measurement object contacts the measurement object at substantially normal incidence.

29. The method of claim 23, further comprising demagnifying the combined wavefronts to form the optical interference pattern on the camera.

30. The method of claim 29, wherein the demagnification is in the range of about 1× to about 0.1×.

31. The method of claim 23, wherein the field of view corresponding to the optical interference pattern is greater than about 5 mm.

32. The method of claim 31, wherein the field of view corresponding to the optical interference pattern is in the range of about 10 mm to 100 mm.

33. The method of claim 23, wherein for at least one of the multiple positions, a difference in optical path to the camera from each of the measurement and reference objects is less than zero, and for at least another of the multiple positions, a difference in optical path to the camera from each of the measurement and reference objects is greater than zero.

34. The method of claim 23, wherein the other portion of the broadband radiation is reflected from a non-flat surface of the reference object.

35. The method of claim 23, wherein the surface of the measurement object is curved.

36. The method of claim 35, further comprising passing one of the portions through at least one compensating optic to produce a curved wavefront.

37. A method for measuring the surface profile of a measurement object comprising:

providing broadband radiation comprising central wavelengths greater than about 1 micron and having a coherence length of less than about 100 microns;

directing a portion of the broadband radiation to reflect from the measurement object;

directing another portion of the broadband radiation to reflect from a reference object;

combining the reflected portions to form an optical interference pattern on a camera for each of multiple relative positions of the measurement object and a reference object; and determining the surface profile based on the optical interference patterns.

38. The method of claim 37, wherein the broadband radiation comprises central wavelengths within the range of about 1 micron to about 20 microns.

39. The method of claim 37, wherein the broadband radiation comprises central wavelengths within the range of about 3 micron to about 11 microns.

40. The method of claim 37, wherein the coherence length of the broadband radiation is in the range of about 10 to about 100 microns.

41. The method of claim 37, wherein the portion of broadband radiation directed to the surface of the measurement object contacts the measurement object at substantially normal incidence.

42. The method of claim 37, further comprising demagnifying the combined wavefronts to form the optical interference pattern on the camera.

43. The method of claim 42, wherein the demagnification is in the range of about 1× to about 0.1×.

44. The method of claim 37, wherein the field of view corresponding to the optical interference pattern is greater than about 5 mm.

45. The method of claim 44, wherein the field of view corresponding to the optical interference pattern is in the range of about 10 mm to 100 mm.

46. The method of claim 37 wherein the measurement object is partially transparent at the central wavelengths of the broadband radiation and the method further comprises positioning the measurement and reference objects to produce optical interference patterns corresponding to reflections from each of front and back surfaces of the measurement object and determining the thickness profile of the measurement object based on the optical interference patterns.

47. A method for measuring the thickness profile of a measurement object relative to a reference object comprising:

providing broadband radiation comprising central wavelengths greater than about 1 micron and having a coherence length of less than about 100 microns;

directing a portion of the broadband radiation through the measurement object;

directing another portion of the broadband radiation through the reference object;

combining the portions to form an optical interference pattern on a camera for each of multiple relative positions of the measurement object and a reference object; and determining the thickness profile based on the optical interference patterns.

48. The method of claim 47, wherein the broadband radiation comprises central wavelengths within the range of about 1 micron to about 20 microns.

49. The method of claim 47, wherein the broadband radiation comprises central wavelengths within the range of about 3 micron to about 11 microns.

50. The method of claim 47, wherein the coherence length of the broadband radiation is in the range of about 10 to about 100 microns.

51. A method for measuring a surface profile of a measurement object that appears rough at visible wavelengths, the method comprising:

providing broadband infrared radiation for which the measurement object appears specular; and using the broadband infrared radiation to perform scanning interferometric measurements of the surface profile.

* * * * *